United States Patent [19]

De Bortoli

[11] Patent Number: 5,560,685
[45] Date of Patent: Oct. 1, 1996

[54] CUSHIONED WHEEL FOR ROLLER SKATES

[76] Inventor: Giuseppe De Bortoli, via Castellana, 195, 31044 Montebelluna (TV), Italy

[21] Appl. No.: 305,969

[22] Filed: Sep. 15, 1994

[30] Foreign Application Priority Data

Jul. 28, 1994 [IT] Italy ................... VI94A0121

[51] Int. Cl.⁶ ..................................... B60B 9/00
[52] U.S. Cl. .................. 301/5.3; 152/50; 152/59
[58] Field of Search .............. 301/5.3, 5.7, 64.7; 280/11.19, 11.22, 11.23; 152/40, 42, 46, 47, 48, 50, 59, 92

[56] References Cited

U.S. PATENT DOCUMENTS

| | | | |
|---|---|---|---|
| 644,730 | 3/1900 | Colt | 152/92 |
| 1,143,304 | 6/1915 | Nettle | 152/50 X |
| 1,185,097 | 5/1916 | Hopkins | 152/46 |
| 1,566,609 | 12/1925 | Larsen | 152/47 X |
| 1,657,535 | 1/1928 | Hatfield | 152/59 X |
| 2,463,226 | 3/1949 | Walden | 152/47 |
| 2,656,220 | 10/1953 | Coldwell | 301/5.7 |
| 2,670,242 | 2/1954 | Beckman | 301/5.7 |

*Primary Examiner*—Russell D. Stormer
*Attorney, Agent, or Firm*—Watson Cole Stevens Davis, P.L.L.C.

[57] ABSTRACT

The invention discloses a wheel for roller skates, comprising: a tubular central body (1, 15) suited to lodge in its interior one or two bearings (2, 3) inserted in the supporting pivot (4) of said wheel and a toroidal covering layer (5) wrapped around said central body and co-axial with it, made of material suited to allow the rolling of said wheel on the contact surface. Said wheel presents at least one annular element made of shock-absorbing material, said annular element being placed between said central body (1, 15) and said toroidal covering layer (5), such as to permit the out-of-alignment between the central body and the toroidal covering layer, whenever said wheel bumps into the irregularities of the rolling surface.

8 Claims, 5 Drawing Sheets

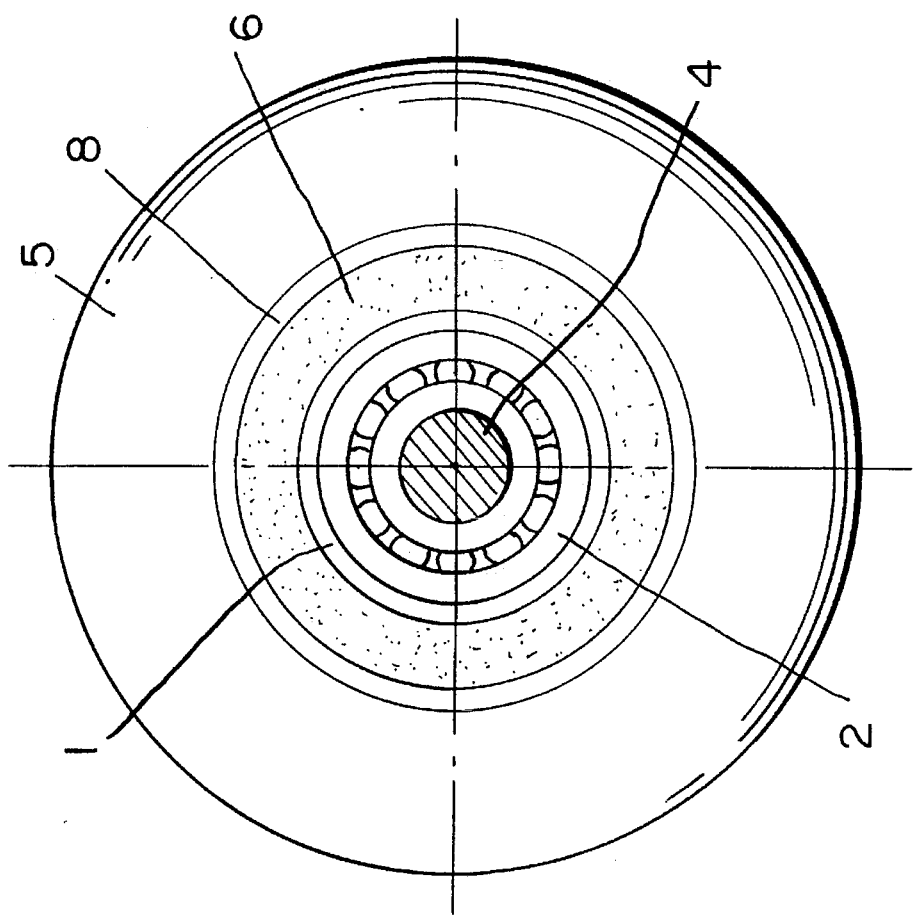
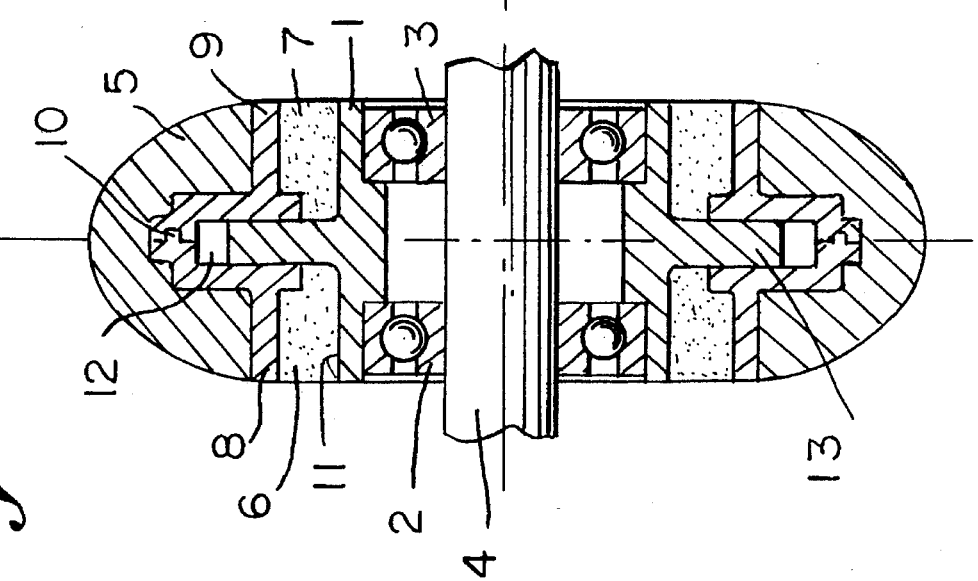

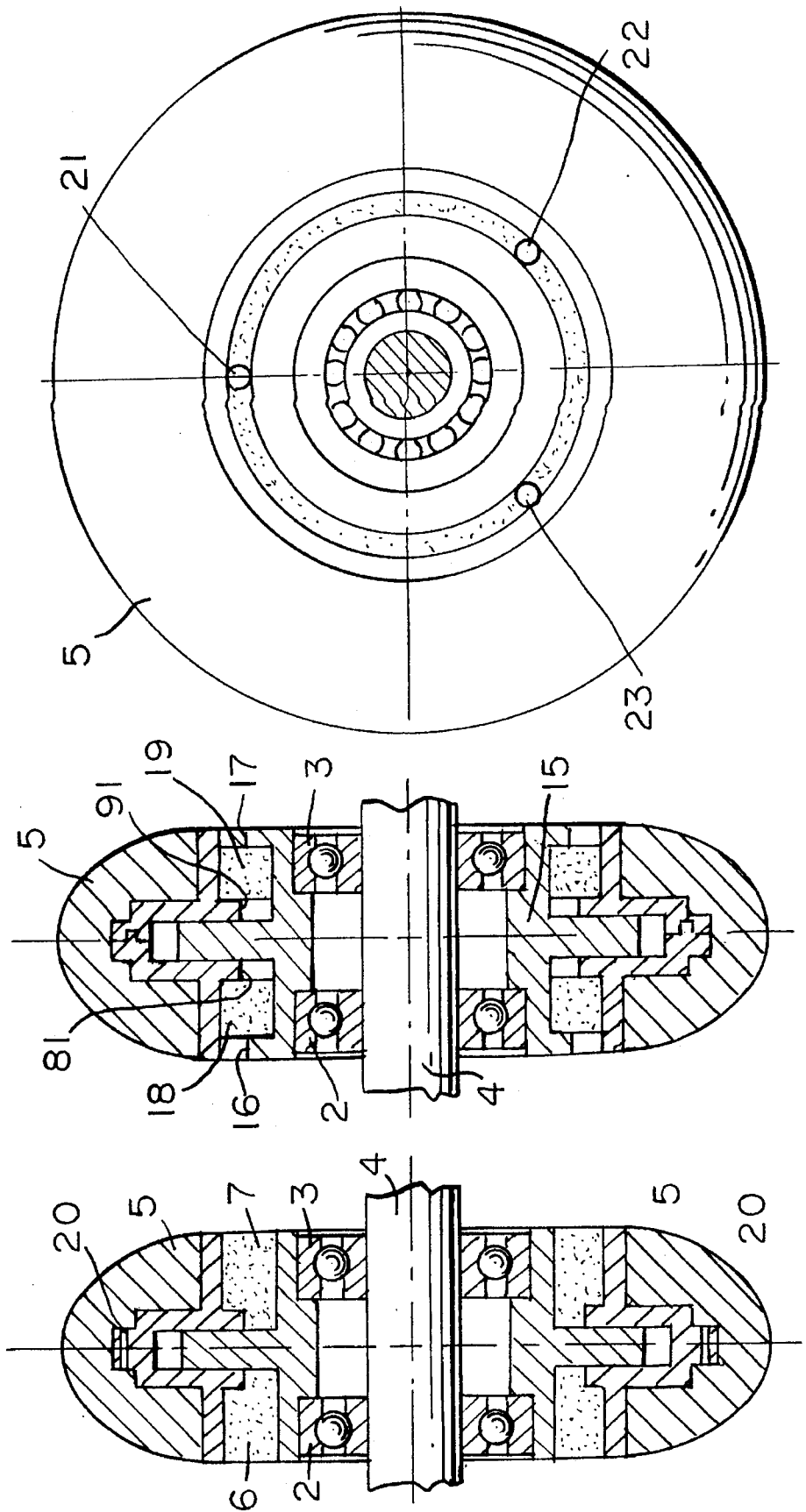

5,560,685

CUSHIONED WHEEL FOR ROLLER SKATES

BACKGROUND OF THE INVENTION

1. Field of the Invention

The invention discloses a cushioned wheel for roller skates.

2. General State of the Art

The models of roller skates which are available on the market present a plurality of wheels, four for instance, mounted on a supporting frame which is rigidly connected with the shoe made of plastic material which is directly worn by the user.

Both the shoe and the wheel-supporting frame are rigidly connected with each other. The wheels can not oscillate and they can only rotate around their own axis. An embodiment of a wheel for roller skates according to the known technique is shown in a cross section view in FIG. 1.

When the just described roller skates are used on skating rings designed for that purpose, which are usually made with pavements of plastic material, are extremely regular and do not present any bumps, the users do not meet with any relevant inconveniences.

However, the described roller skates are used on roads or on side-walks having irregular surfaces. Moreover, when used on roads, the roller skates can also meet with bumps or rocks and, therefore, it frequently occurs that the wheels, because of the impact with said sudden bumps, are removed from the ground and then undergo a violent impact when falling down again.

In order to avoid said effects which cause a loss of speed of the roller skate and also strong shocks on the legs and the back bone of the user, roller skates have been developed which present a sort of shock absorbers between the wheel supporting frame and the overlying shoe. While this type of remedy alleviates the discomfort of the user, it also increases his chances of falling and it does not prevent the wheels from being blocked because of the sudden impact when they hit the ground again.

SUMMARY OF THE INVENTION

The purpose of the present invention is, therefore, to develop a wheel for roller skates which can overcome the above-mentioned inconveniences. Another purpose is that such wheels for roller skates according to the invention may be applied on the frame without significant modifications of the shape of the roller skates such as they are built now.

More specifically the intended purpose is for the wheels themselves to be able to absorb the shock against the encountered obstacles and to decrease, if not completely eliminate, their coming off the ground because of said impact.

In order to achieve the above, it is necessary for the wheels to be able to undergo a momentary out-of-alignment in relation to their own axis of rotation during the impact against the encountered obstacle and then to center themselves again in relation to their supporting axis.

The above-mentioned purpose and others which will be better illustrated hereinafter are reached by the present invention of a wheel for roller skates which comprises:

a tubular central body suited to lodge in its interior one or two bearings inserted in the supporting pivot of said wheel and a toroidal covering layer wrapped around said central body and co-axial with it, made of material suited to allow the rolling of the wheel on the contact surface, wherein said wheel, in accordance with the contents of the first claim, is characterized in that it presents at least one annular element made of shock-absorbing material, said annular element being placed between said central body and said toroidal covering layer, such as to permit the out-of-alignment between the central body and the toroidal covering layer, whenever said wheel bumps into the irregularities of the rolling surface.

In a preferred embodiment of the invention the shock absorbing annular elements are two in number and they are held inside two half-shells which are connected with each other, so as to create, together with the outer surface of the central body a holding cage for said annular elements. The outer surface of said half-shells is anchored to the toroidal covering layer and the two half-shells are united together so as to form in their center an annular cavity slidingly lodging the diaphragm of the central body.

BRIEF DESCRIPTION OF THE DRAWINGS

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description and from the drawings, wherein:

FIG. 2 shows a cross section of a wheel for roller skates according to the invention;

FIG. 3 is a lateral view of the wheel for roller skates of FIG. 2;

FIG. 4 is a cross-section representation of a second embodiment of the invention;

FIG. 5 shows a modified embodiment of the two half-shells belonging to the wheel according to the invention;

FIG. 6 shows a lateral view of another embodiment of the wheel according to the invention.

DESCRIPTION OF THE PREFERRED EMBODIMENT

Figure 1:
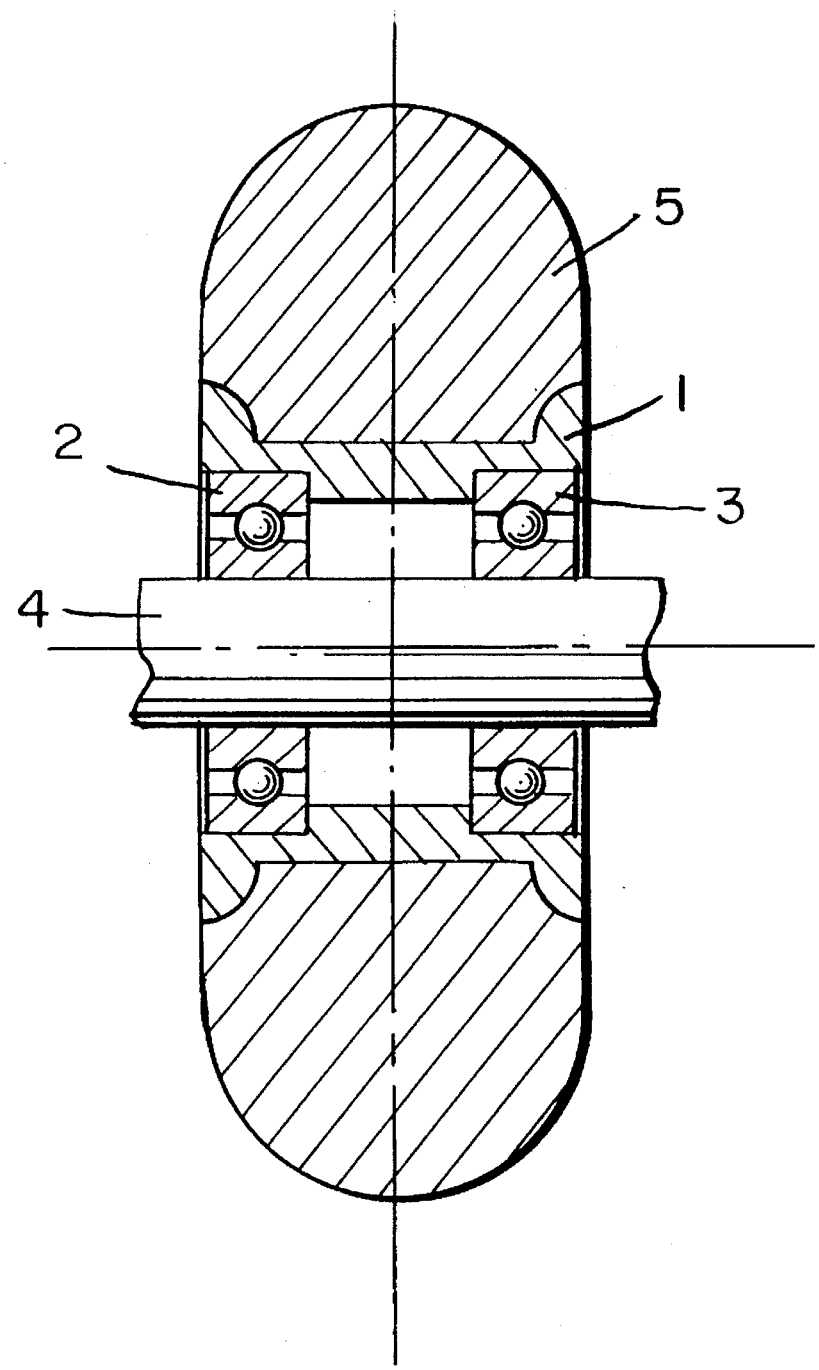
FIG. 1 represents a cross-section of a wheel for roller skates according to the known technique.

With reference to FIG. 1, which represents a wheel according to the known technique, it can be observed that a wheel of the known type consists of a central body 1 which lodges in its interior two bearings, indicated with 2 and 3, which in turn support the pivot 4. The outer wall of the central body 1 is surrounded by a toroidal covering layer 5 made of a special material, in order to obtain a reduced friction with the ground and which is usually a thermosetting polyurethane applied by casting on the central body 1 made of plastic material.

Figure 2A:
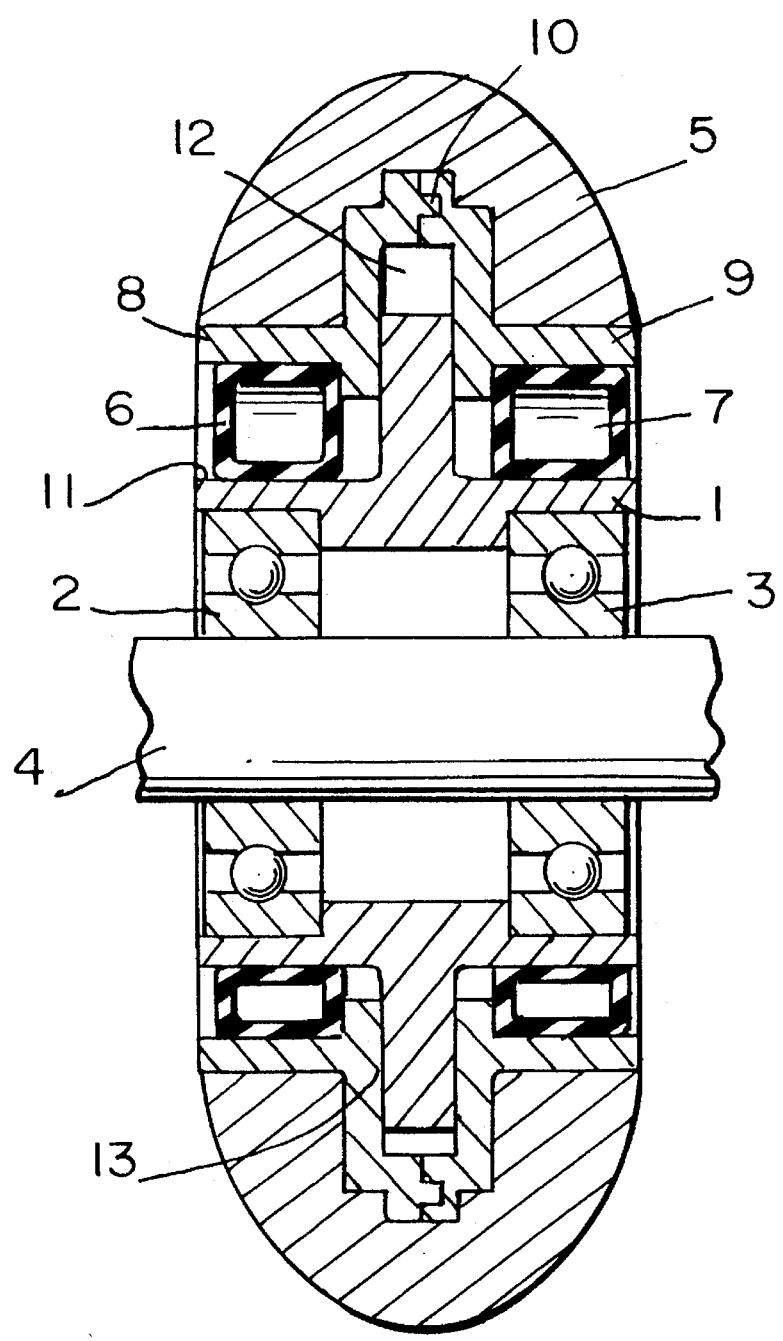
FIG. 2A is a cross-sectional view of an embodiment of the invention employing an air tube.
Figure 2B:
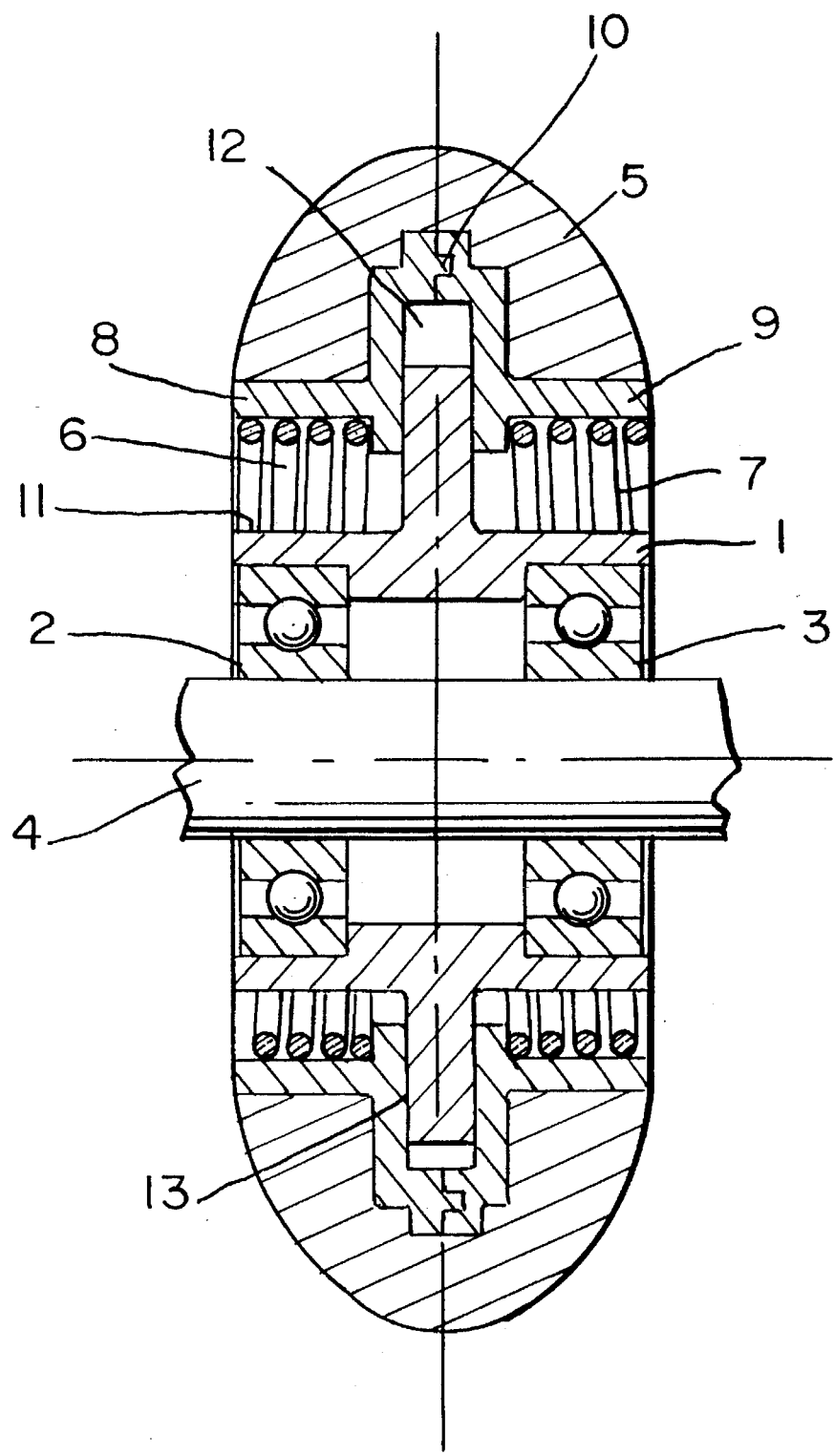
FIG. 2B is a cross-section of an embodiment of the invention employing a spring.

According to the invention, it can be observed in FIG. 2 that the outer surface of the central body 1 does not touch directly the toroidal covering layer 5 but presents two annular elements, indicated with 6 and 7, which are comprised between the outer surface 11 of the tubular central body 1 and the inner surface of two half-shells 8 and 9, also made of plastic material as the tubular central body 1, and are joined together along their circumferences through a circular male-female impression indicated with 10.

The annular elements 6 and 7 are made of an elastic and shock-absorbing material, such as for instance, a single-component elastomer. However, such shock-absorbing annular elements can be obtained in other ways, for instance by means of air-tubes 6A and 7A or of steel ring-springs 6B and 7B.

As can be observed in FIG. 2, the half-shells 8 and 9 have such a shape, so as to form a cavity 12 inside which is comprised the diaphragm 13 belonging to the central body. The diaphragm 13 has a thickness such that it can freely slide inside the space 12 created by the half-shells 8 and 9, whenever the wheel undergoes a sudden impact and because of such an impact the shock-absorbing annular elements 6 and 7 are compressed under the action of the impact received by the wheel which bumps into the obstacle encountered on the ground.

It is, therefore, understood that, because of the shock-absorbing action exerted by the annular elements 6 and 7 and because of the possibility for the tubular central body 1 to get out of alignment in relation to the axis of the wheel, and, therefore, to move upwards from the ground inside the annular space 12 created by the two half-shells 8 and 9, the shock-absorbing effect in the wheel according to the invention is achieved. In fact, only for a moment, said wheel gets out of alignment and essentially follows the contours of the obstacle on the ground without coming off of it.

It can be assumed that with the cushioned wheels according to the invention, the wheel does not lose the contact with the ground and, therefore, the speed of the roller skate is not decreased. Moreover, since the contact with the ground is kept, any chances of falling for those who wear roller skates with such a type of wheels are also avoided.

According to a modified embodiment represented in FIG. 4, the wheel according to the invention presents a body 15 similar in the inner part to the body 1 but presenting in its outer rim two shoulders 16 and 17 which contain the two shock-absorbing annular elements 18 and 19 on one side, while, on the other side, the two shock-absorbing elements 18 and 19 are kept in line by annular indentations 81 for the half-shell 8, and 91 for the half-shell 9, respectively.

An embodiment of the two half-shells 8 and 9 modified in their junction area is shown in the cross-section representation of FIG. 5. In such a cross-section representation it can be observed that the half-shells 8 and 9 present some holes 20 arranged along the circumference and such as to be filled with the material of the toroidal covering layer 5, during the cast moulding process of such a material. In such a way, besides having a safe locking of the two half-shells 8 and 9, a higher anchorage between the central body and the toroidal element is also ensured.

FIG. 6 shows a modified embodiment of the wheels of FIGS. 2, 4 and 5 according to the invention. It can be observed that in the shock-absorbing material constituting the annular elements 8 and 9 or 18 and 19 there are three holes, axially arranged at 120° from each other which lodge some parallel pins 21, 22 and 23 having the same diameter as the dimension of the space between the central body of the wheel and the half-shell.

In such a way it is obvious that the shock-absorbing effect is neutralized and, therefore, the wheel according to the invention is made to work again as a normal wheel belonging to the known technique.

Such a modified embodiment can be useful when it necessary to differentiate the behavior of the wheels of the skate rollers according to the type of ground on which they are to be used.

Therefore, should the roller skates be used on a ring designed for that purpose, the pins 21, 22 and 23 can be inserted for blocking the oscillation of the wheels; instead, should the roller skates be used on a road, by removing the pins 21, 22 and 23 for each wheel, it is possible to exploit the advantage of the shock-absorbing effect of the wheel according to the invention.

I claim:

1. A wheel for roller skates adapted to be rotatable on an axial shaft against a contact surface, comprising:

a tubular central body having a central axial opening, wherein said central body includes a disc extending radially outwardly in a plane perpendicular to the central axial opening thereof;

at least one bearing located in the central opening for receiving the axial shaft therein;

a toroidal covering layer wrapped around said central body and co-axial therewith formed of material suited to allow the rolling of said wheel on the contact surface;

a pair of half-shells connected to each other forming an annular cavity therein for slidably receiving the disc therein, each of said half-shells forming a corresponding cavity defined by an outer surface of the central body, a radial surface of the disc and an inner surface of each half-shell said half-shells being formed with a plurality of holes interconnecting the half-shells, and a portion of the toroidal covering extending within the holes for securing the half-shells together; and an annular element formed of shock absorbing material located in each of said chambers, for accommodating misalignment of the central body and the toroidal covering layer when the wheel bumps the contact surface.

2. A wheel according to claim 1, wherein the material of which the shock-absorbing annular element is made, comprises a single component elastomer.

3. A wheel according to claim 1, wherein the material of which the shock-absorbing annular element is made, comprises an air tube.

4. A wheel according to claim 1, wherein the material of which the shock-absorbing annular element is made, comprises a ring spring.

5. A wheel for roller skates adapted to be rotatable on an axial shaft against a contact surface, comprising:

a tubular central body having a central axial opening, wherein said central body includes a disc extending radially outwardly in a plane perpendicular to the central axial opening thereof;

at least one bearing located in the central opening for receiving the axial shaft therein;

a toroidal covering layer wrapped around said central body and co-axial therewith;

a pair of half-shells connected to each other forming an annular cavity therein for slidably receiving the disc therein, each of said half-shells forming a corresponding cavity defined by an outer surface of the central body, a radial surface of the disc and an inner surface of each half-shell;

an annular element formed of shock absorbing material located in each of said chambers for accommodating misalignment of the central body and the toroidal covering layers where the wheel bumps the contact surface;

said annular element being formed with at least three cylindrical openings, each having an axis parallel to the axis of the wheel, said openings being arranged at about 120° circumferential intervals from each other and having a diameter corresponding to a space between the outer wall of the central body and an inner wall of the half-shell; and a pin secured in each of said openings for neutralizing the shock-absorbing affect of the wheel.

6. A wheel for roller skates adapted to be rotatable over an axial shaft against a contact surface, comprising:

a tubular central body having a central axial opening, wherein said central body includes a disc extending radially outwardly in a plane perpendicular to the central axial opening thereof;

an axial shaft located in the opening;

bearing means located in the central opening for receiving the axial shaft therein;

a toroidal covering layer formed around the central body and coaxial therewith;

a pair of half-shell members located about the disc and having an annular opening for slidably receiving the disc therein for accommodating misalignment of the central body and the toroidal covering layer when the wheel bumps the contact surface, the disc and the half-shell members each forming a chamber on each lateral side of the disc; and an elastomeric member secured in each lateral chamber.

7. The wheel of claim 6 wherein the tubular central body includes an upstanding radially extending first wall portion at an outer marginal edge thereof and wherein each half-shell member includes a depending radially extending second wall portion at an inboard edge thereof adjacent the disc, said radially first and second wall portions members for securing the annular elements within the corresponding chambers.

8. The wheel of claim 6 wherein the bearing means comprises a pair of bearings secured in the central opening.

* * * * *